United States Patent [19]

Maloof

[11] 4,202,655
[45] May 13, 1980

[54] PROPELLER FAN BLADING AND HUB THEREFOR

[76] Inventor: Ralph P. Maloof, 4527 Pk. Monaco, Calabasas, Calif. 91302

[21] Appl. No.: 805,283

[22] Filed: Jun. 10, 1977

[51] Int. Cl.² .................................................. B64C 11/18
[52] U.S. Cl. ................................ 416/237; 416/223 R; 416/157 R
[58] Field of Search ............... 416/157, 167, 223, 234, 416/237, 237 A, 239, 248, 243

[56] References Cited

U.S. PATENT DOCUMENTS

| | | | |
|---|---|---|---|
| 1,068,946 | 7/1913 | Taylor | 416/237 |
| 1,368,747 | 2/1921 | Pattosien | 416/237 X |
| 1,968,918 | 8/1934 | Toth | 416/237 |
| 2,161,444 | 6/1939 | Albers | 416/237 |
| 2,236,494 | 3/1941 | Albers | 416/223 |
| 2,255,920 | 9/1941 | Englesson | 416/157 |
| 2,304,153 | 12/1942 | DiCesare | 416/157 |
| 2,345,047 | 3/1944 | Houghton | 416/223 |
| 2,880,496 | 4/1959 | Benedict et al. | 29/156.8 |
| 2,938,585 | 5/1960 | Fanti | 416/243 |
| 3,119,453 | 1/1964 | Haig | 416/239 |
| 3,200,477 | 8/1965 | Shultz | 29/156.8 |
| 3,239,011 | 3/1966 | Brownlee | 416/239 X |

FOREIGN PATENT DOCUMENTS

| | | | |
|---|---|---|---|
| 1113386 | 8/1961 | Fed. Rep. of Germany | 416/237 |
| 2626304 | 12/1976 | Fed. Rep. of Germany | 416/237 |

OTHER PUBLICATIONS

Product Engineering, Jul. 6, 1970, pp. 92-93.

*Primary Examiner*—Everette A. Powell, Jr.
*Attorney, Agent, or Firm*—William H. Maxwell

[57] ABSTRACT

Propeller and fan blading comprised of an extruded airfoil having a rib retained at the root for mounting and with a portion thereof removed by flattening the back of the blade truncating the back camber thereof in a plane tapered toward the blade tip with respect to the front camber thereof and having a flap of full configuration toward the root of the blade and continuing tangent from the front camber and extending angularly back from the back camber and reduced toward the blade tip by profiling the trailing edge made thin toward said tip by a flattening truncating the back trailing portion of the blade toward said tip, the said blading being controllably pitched and feathered by a hub having cylinder and piston means responsive to engine oil pressure and rotating the blades on their radial axes to a full pitch position by link and lever means biased toward a feathered position by an adjustor means having adjustable stops and means for maintaining moderate pitch until the engine is stopped.

23 Claims, 27 Drawing Figures

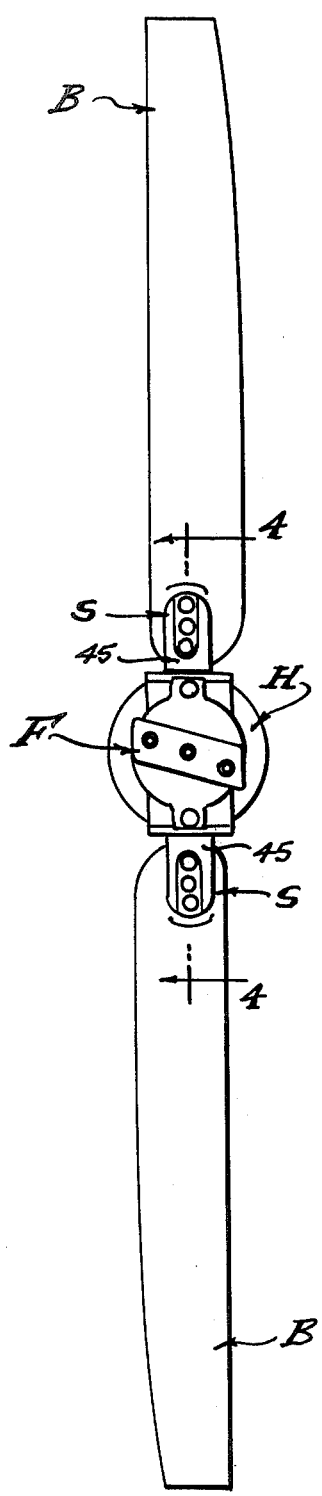
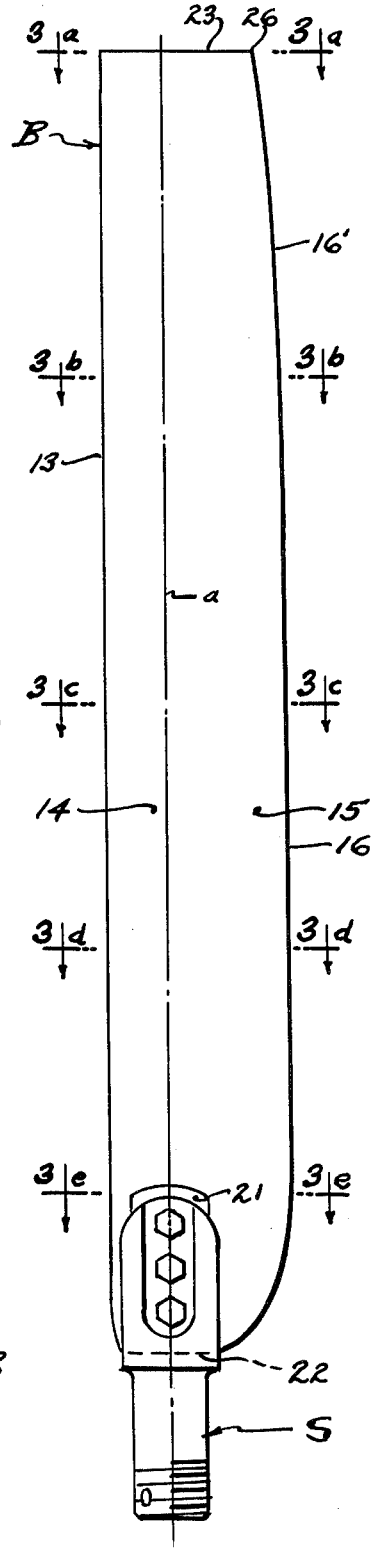
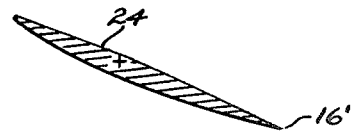
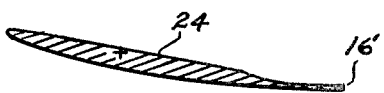

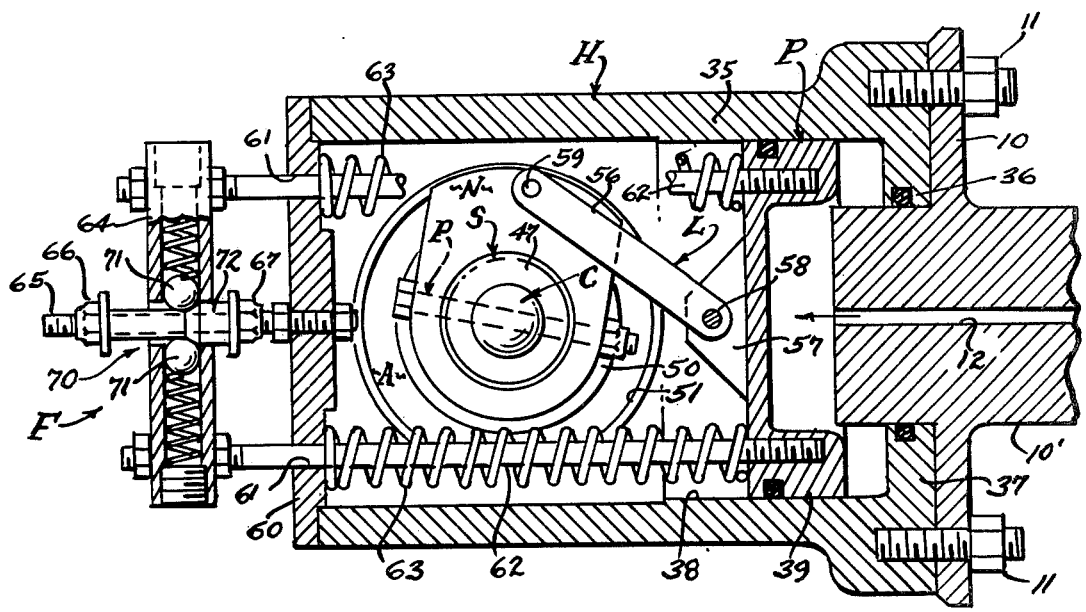
FIG. 5.
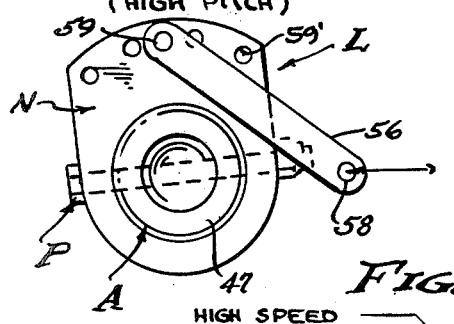
FIG. 5a. (HIGH PITCH)
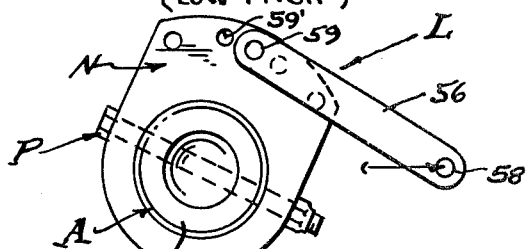
FIG. 5b. (LOW PITCH)
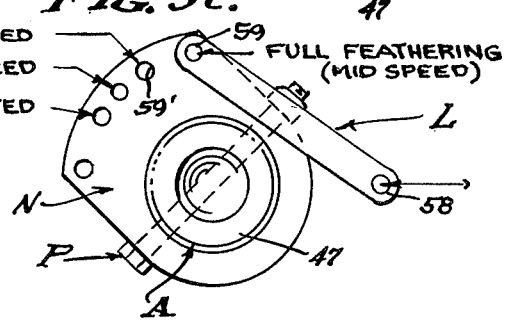
FIG. 5c.

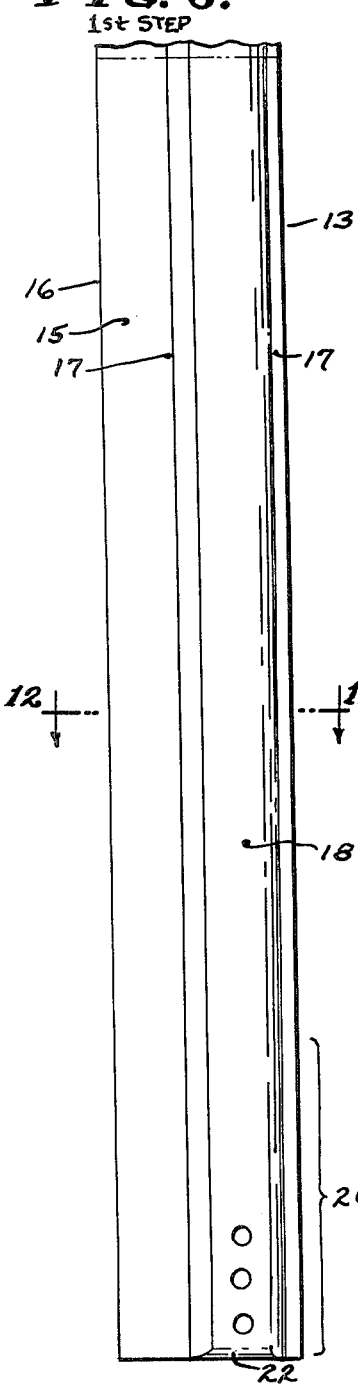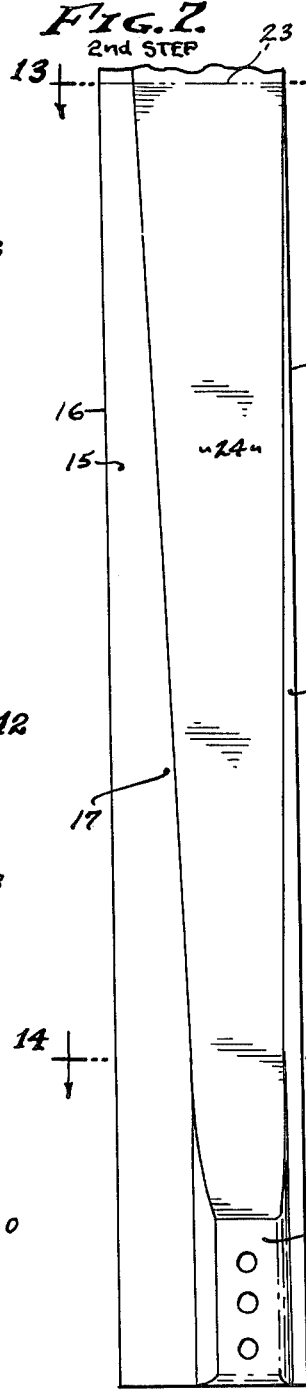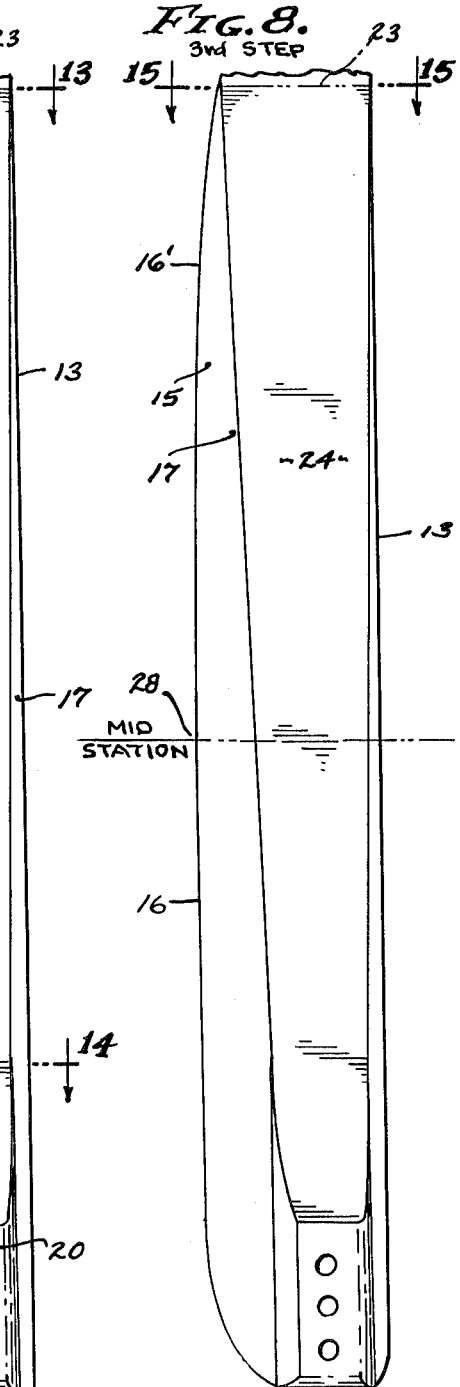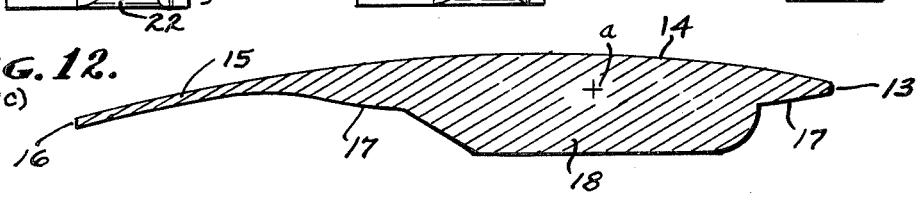

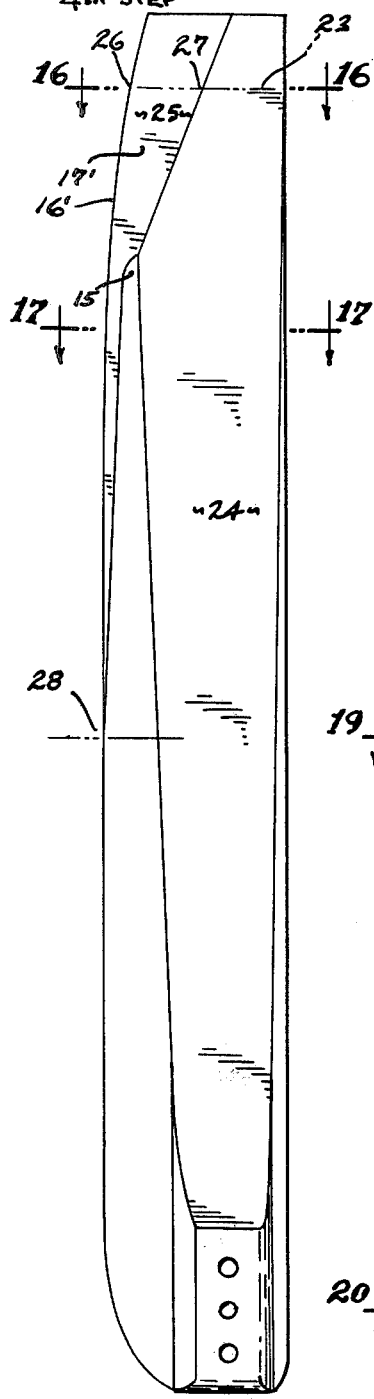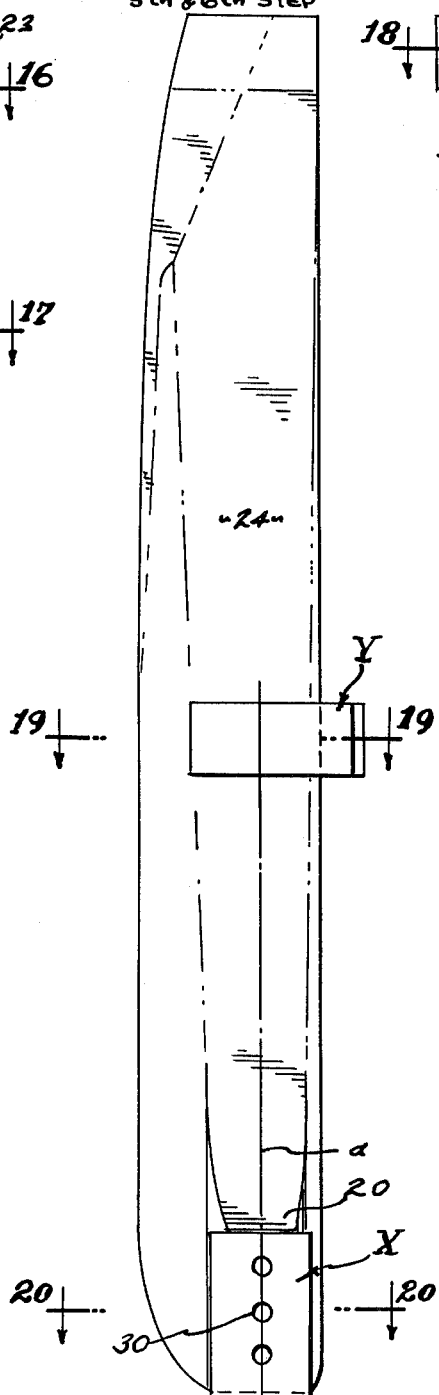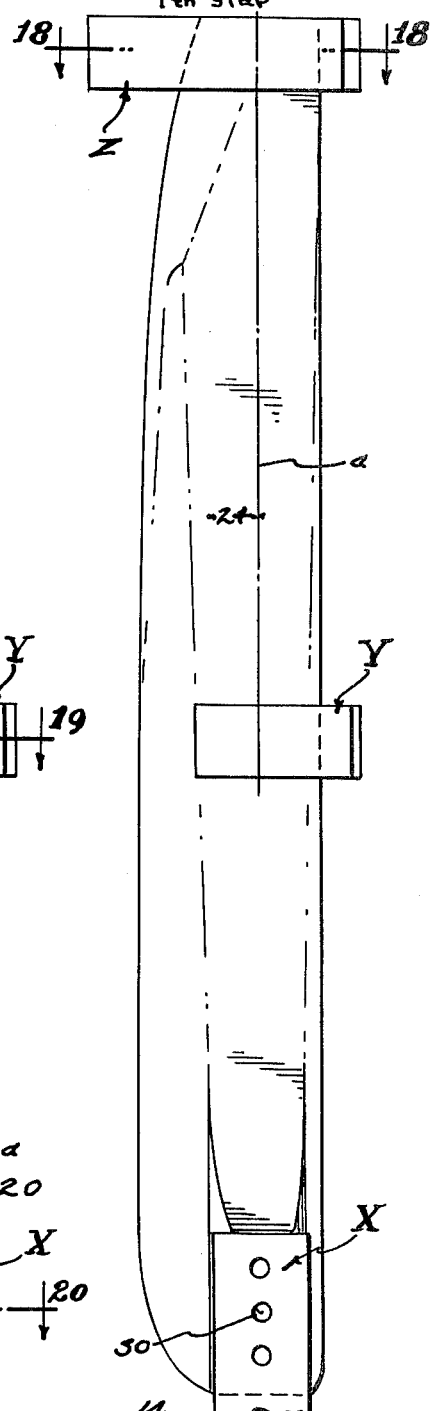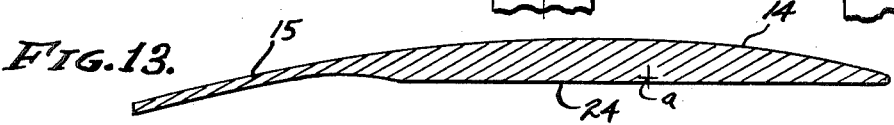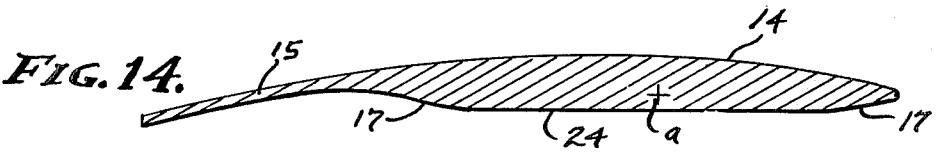

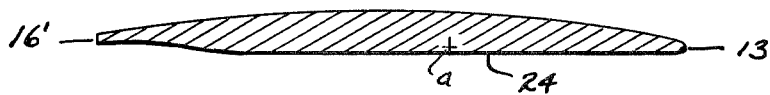
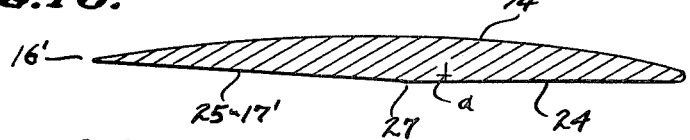
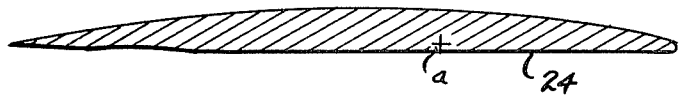
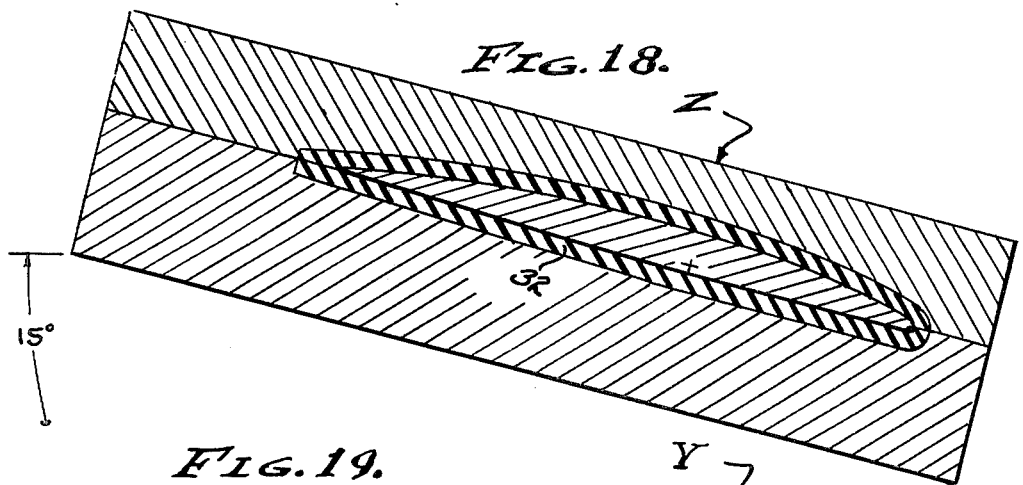
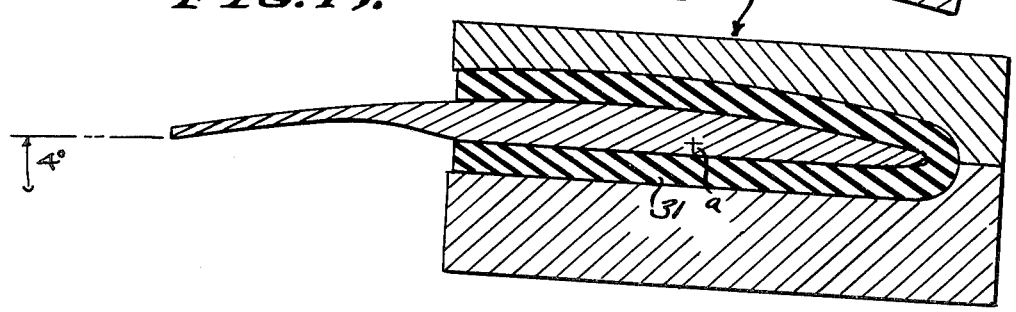
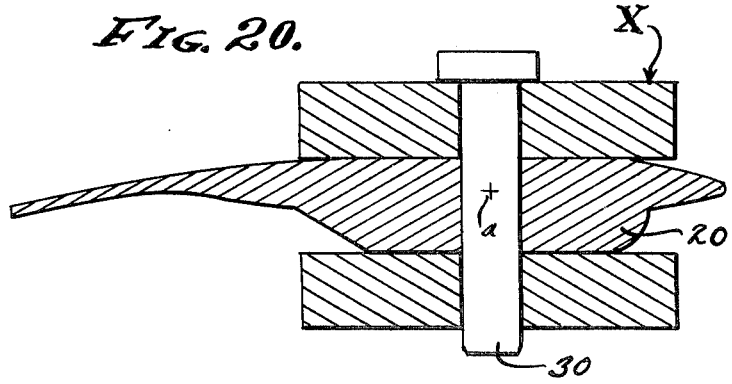

PROPELLER FAN BLADING AND HUB THEREFOR

BACKGROUND

The construction of propeller blades for aeroplanes and for the propulsion of air in general is costly when high performance is a requirement; with the involvement of laminated wood and glass fiber encasements or the use of complex castings and machined metal forgings therefor. The number of blades will vary from two to three or four and more, it being common practice to provide air circulation fans with a plurality of blades greatly in excess of the pair or several blades which characterize the propellers of small aircraft, for example. Heretofore, resort has been made to the use of extrusions in the formation of propeller blade cross sections, in place of the characteristc screw shaped wooden or metallic blades that vary in cross section from root to tip. However, the uniform cross section which has characterized extruded propeller blades has not been conducive to ultimate efficiency, and to this end it is an object of this invention to provide the economy of extruded blading with the efficiency of sophisticated blade design having optimum pitch and cross sectional configuration varying from root to tip, as may be required. In practice, the circular speed of the propeller blade cross section increases from roof to tip, being subsonic toward the root and often supersonic toward the tip. Consequently, efficiency must be achieved by means of increased pitch toward the root, and conversely by means of decreased pitch toward the tip in order to preclude high speed stall, and further by means of progressively higher speed blade cross sections toward the tip. These advantages are attained with the present invention.

Sophisticated propeller blading combines the aforementioned features relating to aerodynamic requirements and structural requirements as well. Accordingly, propeller blades are tapered commensurate with the stresses to be encountered thereby, and consequently are of thicker cross section toward the root and of thinner cross section toward the tip. Heretofore, extruded propeller blading has not been conducive to a tapered configuration, however it is an object of this invention to taper extruded propeller blading for the combined purposes of advantageously varying the aerodynamics of its cross section from root to tip and of reducing its strength from root to tip. With the present invention, optimum aerodynamics and strength is realized.

The material substance of propeller blading and mode of manufacture is of great concern, since the laminate, cast and forged structures of the accepted prior art blading are very expensive and vulnerable to damage beyond repair; for instance, with the slightest damage an aircraft propeller is no longer airworthy, and to this end it is an object of this invention to provide a material substance and its formation which is the least vulnerable to damage and which inherently meets the requirements of airworthiness; and which in the event of damage is replaceable at a minimum of cost. With the present invention, an aluminum alloy extrusion is used in preference to a wood laminate, cast or forged aluminum member, at great savings in cost of material and working required to fabricate the same. As will be described, the mass of the propeller blade is minimized in the wrought cross section that varies in both shape and pitch from roof to tip. As a result, there is root stiffness and tip flexibility, and all of which is replaceable on a mounting stem.

Heretofore, extruded propeller blading has been restricted to the straightened and uniform cross section of its basic form, and inherently ineffecient for lack of sophistication, as pointed out above. Attempts have been made in the past to twist extruded blades, but unsuccessfully for lack of uniformity in the progressive variation of pitch related to cross section. It is an object therefore, of this invention to provide a method that is simple and practical by which a uniform and predictable variation in pitch from root to tip is successfully obtained, after a minimum amount of machining is performed so as to establish constant varying optimum cross sectional configurations. With the method hereinafter disclosed, the blade is twisted progressively by means of simultaneously applying twisting forces both above and below the elastic limit of the malleable material substance forming the blade.

The higher as compared with lower velocity airfoils vary greatly from root to tip of propeller blades, with respect to length of chord the front and back cambers, and the helical pitch. Further, fineness or depth of the airfoil diminishes progressively toward the tip: the front camber being convex throughout the blade length, and the back camber being concaved toward the root and flattened toward the tip. Therefore, it is an object to include these advantageous features in an extruded airfoil for propeller blading, by extruding a basic airfoil configuration that presents a useable front camber configuration, and a rear configuration that is partially removed so as to provide a flattened back camber that retains a convexely narrowing leading edge, a concaved trailing edge toward the root, and a convex trailing edge toward the tip. With the present invention, extrusion modification by machining at the rear side thereof, truncation thereof to reduce chord length toward the tip being coordinated with back side reduction so as to control and establish thinness at the trailing edge. The removal of material substance at the back of the blade precedes the aforementioned progressive twisting into helical form.

The controllability of blade pitch in propellers is recognized as a necessity with certain types of aircraft. For example, blade pitch is to vary with engine RPM and is to feather when the engine is stopped; conditions especially adapted to powered sail planes and the like. To this end it is a general object of this invention to provide a propeller hub responsive to engine oil pressure so as to apply blade pitch and to flatten the same with increased engine RPM, and to hold a moderate pitch until engine operation ceases and at which time the blades are feathered. However, it is to be understood that this propeller hub is also adapted to controlled pitch through the application of adjusted fluid pressure. The blade control mechanism is piston operated through selectively adjustable link and lever connections to each blade, whereby the propeller is adapted to engines of varied performance. The moderate pitch is maintained by a spring biased cam and follower means, and the maximum and minimum pitch requirements are adjustable. And, assembly is unique by the use of a thrust ball intermediate the opposed blade stems rotatable on radial-axial thrust bearings seated within a surrounding hub housing. Assembly of the separate blade stems is by means of a lever-nut secured rotatively to each blade stem by a removable pin. As will be described and as shown, durability and compactness is provided in a propeller hub with parts accessible.

SUMMARY OF INVENTION

This invention relates to propellers and fan blading and especially to controlled pitch aircraft propellers such as those used in light aircraft and powered sail planes. A feature herein is the employment of an extrusion as the basic cross sectional configuration of the propeller blade airfoil, and all of which is accomplished by the discriminate removal of material at the rear of the extruded blade to establish the variable camber configuration progressing from a low velocity airfoil toward the root of the blade and to a high velocity airfoil toward the tip of the blade. Conjointly with the said cross sectional variations, the blade is controllably twisted after machining and into its final and permanent formation by means of torsion applied discriminately at various radial stations therealong, and to the end that pitch is uniformly decreased toward the tip despite the tapering cross sectional configuration, all as hereinafter described.

DRAWINGS

The various objects and features of this invention will be fully understood from the following detailed description of the typical preferred forms and applications thereof, throughout which description reference is made to the accompanying drawings, in which:

FIG. 1 is a front view of the controllable pitch hub and blading assembly.

FIG. 2 is an enlarged front view of one blade removed from the assembly of FIG. 1.

Figure 4:
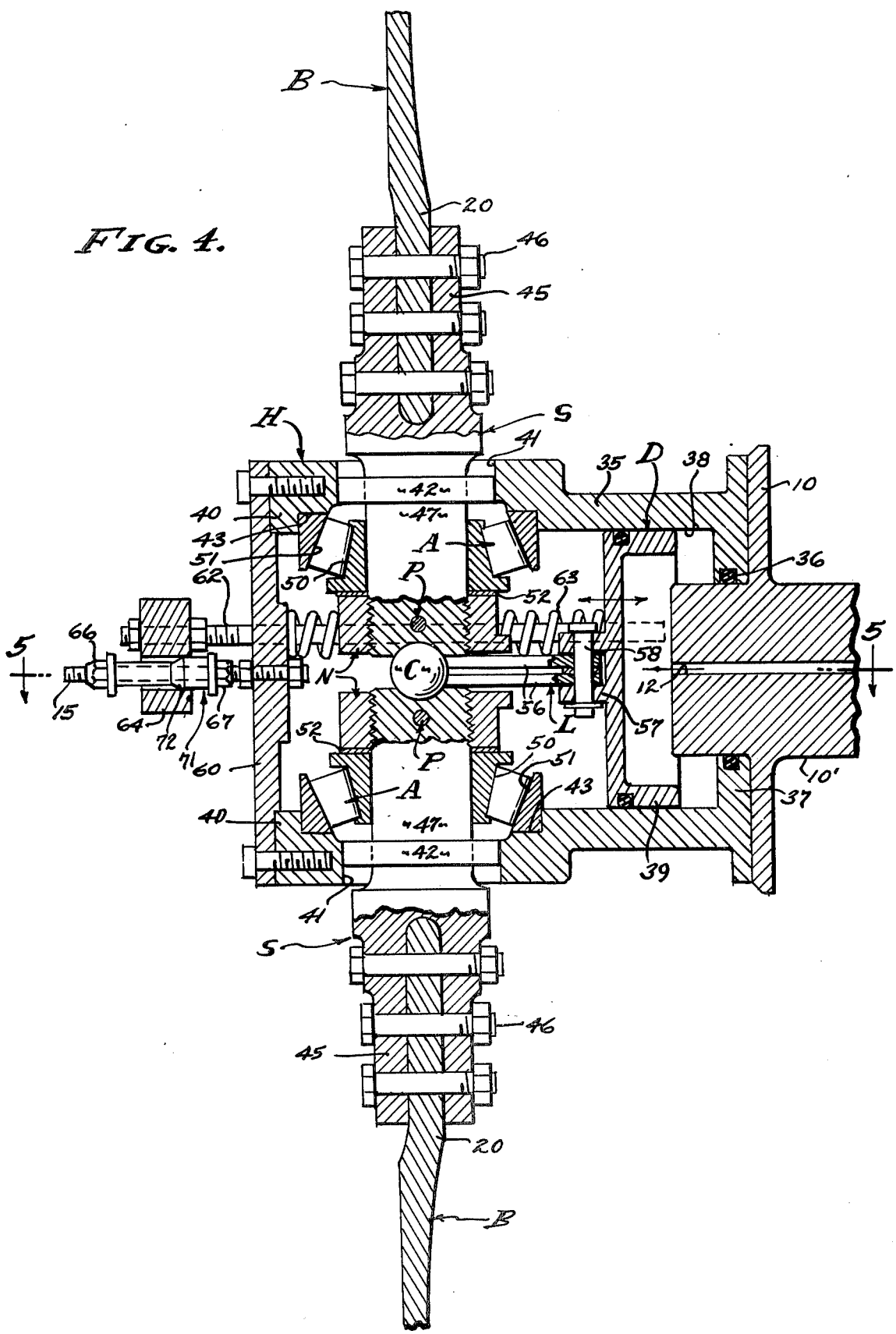

FIGS. 3a through 3e inclusive are enlarged sectional views through the blade taken as indicated by lines 3a—3a through 3e—3e on FIG. 2 respectively.

FIG. 4 is an enlarged longitudinal sectional view of the hub and blade assembly taken as indicated by line 4—4 on FIG. 1.

FIG. 5 is a sectional view taken substantially as indicated by line 5—5 on FIG. 4.

FIGS. 5a, 5b and 5c illustrate the selective positioning of parts removed from FIG. 5, showing their high pitch, low pitch and full feathering positions respectively.

FIGS. 6 through 11 are back views of the propeller blade showing the consecutive process steps involved in making the same respectively.

FIG. 12 represents the first step of the process and is an enlarged sectional view of the basic extrusion employed herein and taken as indicated by line 12—12 on FIG. 6.

FIGS. 13 and 14 are enlarged sectional views resulting from the second step of the process and taken as indicated by lines 13—13 and 14—14 on FIG. 7.

FIG. 15 is an enlarged sectional view resulting from the third step of the process and taken as indicated by line 15—15 on FIG. 8.

FIGS. 16 and 17 are enlarged sectional views resulting from the fourth step of the process and taken as indicated by lines 16—16 and 17—17 on FIG. 9.

FIG. 18 is an enlarged sectional view illustrating the seventh step of the process and taken as indicated by line 18—18 on FIG. 11, and FIGS. 19 and 20 are enlarged sectional views illustrating the sixth step of the process and taken as indicated by lines 19—19 and 20—20 on FIG. 10.

PREFERRED EMBODIMENT

Referring now to the drawings, the propeller blades B are mono-form members replaceably fastened to a revolving stem S carried by anti-friction bearings A disposed on radial axes respectively. The stems are thrust against said bearings by lever-nuts N that are keyed to the stems in each instance by a removable pin P, there being a thrust ball C that radially positions the said stems. The propeller shown is two bladed in which case the axes of bearings A are coaxially disposed through a hub housing H to intersect the rotational axis thereof and all of which is secured to the engine (not shown) drive flange 10 by screw fasteners 11. Coaxial with the rotational axis there is cylinder and piston means D within the housing H and responsive to controlling oil pressure introduced through a port 12 in shaft 10'. Means D connects to the lever-nuts N, the piston thereof being biased toward the feathered position by an adjustor means F that limits the extreme pitch positions and maintains a moderate pitch despite the reduction of oil pressure below a determined norm and to permit feathering upon the absence of oil pressure.

The propeller blade B is a wrought mono-form of aluminum alloy such as for example 2024 aluminum in the fully heat treated T4 condition, extruded into the basic cross sectional configuration shown in FIGS. 6 and 12. As shown, the basic cross section is comprised of an eliptical leading edge 13 that fairs into a convex front camber 14 that constitutes approximately 80% of the chord and which tangentially continues into a flap 15 terminating in a thin trailing edge 16, and a convex back camber 17 that also constitutes approximately 80% of the chord and which concavely continues into said flap 15. The 20% extension of the flap 15 is slightly curvilinear and of uniform minimal thickness and extends angularly and substantially rearward of said back camber 17. Thus, the basic airfoil is lenticular and characterized by the angularly extending flap 15 that determines the nominal thickness of the trailing edge 16. The center of effort of the completed blade will extend along an axis approximately 40% rearward of the leading edge at the root of the blade and parallel therewith. Therefore, centered 40% rearward of the leading edge there is a mounting rib 18 that constitutes approximately 50% of the chord and projects from the back camber 17 to substantially double the blade thickness. Thus, in the basic extrusion the rib 18 covers approximately half of the back camber 17, as shown in FIG. 12, this extrusion being in its straightened and heat treated form of parallel uniform cross section, cut to length somewhat in excess of the finished blade to be described.

The first step of processing the basic extrusion provides the propeller blade B with a mounting boss 20 at its root and (see FIGS. 6 and 12). As shown, the boss 20 extends longitudinally and is comprised of the root portion of the rib 18 machined flat and parallel with respect to a complementary face 21 machined into the front camber 14. The butt 22 of the blade is a half-round radius centered on and disposed normal to the axial longitudinal center of effort of the blade, there being several fastener openings therealong to secure the blade boss in shear to a stem latter described.

The second step of processing the blade extrusion provides the characteristic flattened back camber 17 that extends from the root boss 20 to the blade tip 23 (see FIGS. 7, 13 and 14). It is preferred that this second step preceed the later described fourth the step, a feature of the propeller blade B being its taper in thickness from the root to tip while maintaining leading and trailing portions of the back camber 17 that extend from the leading edge 13 and to the flap 15. As shown, a first flat face 24 is machined into the back side of the basic extrusion, to extend angularly with respect to the front camber 14 from the maximum airfoil thickness at the boss 20 to the minimum airfoil thickness at the tip 23. A structural taper is provided from the boss 20 to a radially positioned station of maximum airfoil cross section, in the form of a concaved fillet fairing into the flat face 24 and preferably an eliptical fillet as shown. Characteristically therefore, the flat face 24 commences at a radial station removed longitudinally from the boss 20 and where the rib 18 is fully truncated and said face 24 tangent with both the leading portion and trailing portion of camber 17, as shown. The degree of taper is determined by extending the flat face 24 to the tip 23 where it meets tangentially with both the convexity of the leading edge 13 and the concavity continuing into the flap 15. It is to be understood that tangency at the leading edge 13 may be imperfect, inasmuch as the front and back cambers 14 and 17 are joined eliptically by said leading edge. A feature, therefore, is the progressively gradual truncation of the leading and trailing surfaces of back camber 17 between the leading edge 13 and flap 15, and characterized by the complete removal of camber 17 at the tip 23.

The third step of processing the blade extrusion provides the blade profile with a reduction of chord toward the tip 23 (see FIGS. 8 and 15). A feature of the blade profile is the straight unaltered leading edge 13 and the arcuate forwardly curved trailing edge 16' machined from the full chord mid station (see FIG. 8) to the tip 23. It will be observed that the trailing edge 16' will remain of uniform thickness due to the uniform thickness of the flap 15 extending rearward from its concaved fairing into the camber 17. In practice, the entire flap 15 is removed at the tip 23 by the forwardly curved trailing edge which thickens as it encroaches upon the concaved fairing, to be made thin as next described.

The fourth step of processing the blade extrusion provides thinness of trailing edge 16' and provides back camber 17' toward the tip 23 (see FIGS. 9, 16 and 17). More specifically, the trailing edge 16' is tapered from a mid station of the blade B to the tip 23 where it is of minimal thickness, by machining a second flat face 25 of triangular plan form that extends between the trailing tip 26 to a point 27 at approximately 50% of the tip chord, and to an apex 28 at said mid station along the blade. Thus, a small amount of camber 17' is applied to the back side of the airfoil, progressing outwardly from the tangency station of the first mentioned flat face 24 with the concaved fairing of flap 15.

The fifth step of processing the blade extrusion provides a smooth transition of surfaces at the back side of the propeller blade B (see FIG. 10). In carrying out the foregoing steps, all ridges formed by surface intersections are obtuse and/or practically imperceptible. However, where ridge definition is perceptible, polishing with light abrasive is sufficient to remove sharpness commensurate with efficiency requirements and which simultaneously removes any machine tool markings.

The sixth step of processing the machined blade extrusion thus far described provides the stress conditions prerequisite for the seventh and final step of this propeller blade fabrication (see FIGS. 10, 19 and 20). In accordance with this invention, the root boss 20 is fixed into a clamp or clevis X simulating the stem fitting of the propeller hub latter described, and aligned with an axis a disposed coincidental with the axial center of the blade B to be formed. And, at least one station between the root and tip of the machined extrusion is revolved in the direction of helical twist positioning the chord of said station at a pre-determined angle as related to the chord at the root station of the extrusion. In practice, the clamp X embraces the root boss 20 and with drive pins 30 that rotatively positions the blade section when torque is applied to a remote station, namely any intermediate station or the endmost station at the tip of the blade. In carrying out the invention, the tip station can be initially revolved and held positioned by means of applying torque not to exceed the elastic limit, followed by positioning and torque applied at an intermediate blade station. Or as shown in FIG. 10 torque can be initially applied to an intermediate station by a rotatable chuck or calliper Y, as next described. That is, a station is initially revolved and held positioned by means of applying torque not to exceed the elastic limit to be followed by the application of torque exceeding the elastic limit at other blade stations.

It wil be seen that the machined blade extrusion is pre-stressed at one or more stations, as shown by means of at least one encompassing calliper Y or Z disposed on axis a and to which position or torque is applied. For example, the calliper Y embraces the intermediate station cross section within elastomeric facers 31, for example ⅛ inch thick, that yieldingly confine the blade section to be positioned thereby in the direction of helical twist. Or the calliper Y embracing the station cross section can be motivated by a torque drive (not shown) tending to turn the confined blade station in the direction of helical twist, all without exceeding the elastic limit at the said blade section. In practice, a calliper Y is applied at the mid station of the blade extrusion as shown.

The seventh and final step of processing the pre-stressed machined blade extrusion provides the finished propeller blade B shown in FIG. 2 and having all of the aforesaid requirements for efficiency (see FIGS. 11 and 18). Accordingly, the endmost or tip station of the pre-stressed blade extrusion is revolved in the direction of helical twist, angularly positioning the chord of said endmost station at a pre-determined angle as related to the chords at the root and intermediate stations of the extrusion. That is, the said endmost station is revolved to a bending point of the blade extrusion exceeding the elastic limit at said endmost blade station. In practice, the application of controlled torque through several stations is complementary, and to the end that a progressively gradual bending of the blade extrusion occurs without over bending the increasingly reduced and weakened cross sections toward the tip of the blade. As shown, an encompassing chuck Z is disposed on axis a and to which positioning torque is applied. For example, the chuck Z embraces an extension of the tip portion of the extrusion within elastomeric facers 32, for example 1/16 inch thick, the yieldingly pressures and turns the endmost blade station sufficiently beyond the yield point thereof to allow spring-back to return said endmost station to the desired helix angle. By pre-stressing as described above, the torque applied to the endmost station adds to that applied to the at least one intermediate station, and to the end that all stations exceed the elastic limit, respectively, with commensurately controlled degrees of bending. In other words, a variable helix is set into the extruded blade with the decreasing angle thereof disposed according to increased radial displacement, and all without over bending of the higher velocity stations which must be disposed at progressively lesser angles toward the tip for efficient operation. The excess extrusion is then removed so as to establish the finished tip 23, and thereby producing a finished propeller blade B (see FIG. 2).

Referring now to the pitch controlling propeller hub and its assembly, a two bladed propeller is shown with diametrically extending blades B configured and fabricated as hereinabove described. The hub housing H is provided to carry the blade B upon the bearings A, and to contain the cylinder and piston means D and lever means L which characterize this invention. The hub housing H is in the nature of a chest having a cylinder portion 35 secured coaxially to the engine flange 10 by the screw fasteners 11, and at least two blade journals 40 disposed on radial axes normal to the first mentioned cylinder portion; in the form disclosed herein, diametrically opposite coaxial blade journals. In practice, a centering boss of reduced diameter projects from the engine flange 10, there being a static seal 36 within a cylinder head 37 to hold the variable fluid pressure applied through port 12. The interior of the hub housing is essentially an open chamber for the accommodation of the cylinder and piston means D, and of the propeller stems S, lever means L, and adjustor means F hereinafter described.

The cylinder and piston means D involves a cylindrical portion of the hub housing, the wall thereof next adjacent to the engine flange having an inner diameter bore 38 of substantial extent, there being a piston 39 operable in said bore and sealed therewith as shown. The piston 39 reciprocates on the central axis of rotation and turns with the housing.

The opposite journals 40 are alike and a description of one will suffice for all, the said journals comprising a chest formation that extends forwardly from the cylindrical portion of the hub housing. Each journal provides a blade opening 41 to receive the stem S and carries a seal 42 engageable with the stem to retain fluids within said housing shaft, and it presents an inwardly faced seat 43 to receive a bearing A. The features of the journal 40 are coaxial, the axes of the two journals being diametrically coincidental as shown, or intersecting when three or more propeller blades B are involved.

The propeller blade stems S are alike, preferably identical, and provide a replaceable fitting to carry the replaceable propeller blades B. As shown, the stem S has a clevis 45 that embraces the boss 20 of the blade and secured thereto by shear fasteners 46 extending through the several matched openings therefor; and the stem has a trunnion 47 entering through the seal 42 and into the chest to carry the lever-nut N associated with the lever means L. Note that the trunnion 47 is free to both shift and turn on its radially disposed axis.

The anti-friction bearings A are alike, preferably identical, and provide a rotatable mounting for the propeller blade B in each instance. In practice, radial-axial thrust roller bearings are employed, with the inner race 50 slideably embracing the stem trunnion 47 and faced to oppose outward thrust, and with the outer race 51 positioned in the journal seat 43 and faced to oppose inward thrust. The lever-nut N is screw threaded onto the innermost end portion of the trunnion 47 and provides an outwardly faced thrust shoulder to positionably engage the inner bearing race 50; with shims 52 therebetween as circumstances require. A removable pin P engages through the lever-nut N and trunnion 47 to rotatively orient the same for the lever action next to be described. The bearing ball C is disposed between the opposed inner ends of the trunnions 47, seated in recesses therein respectively, so as to sustain inward thrust of the journaled blades B.

The lever means L is provided to simultaneously trim the plurality of propeller blades in response to reciprocation of the piston 39, and comprises a link 56 extending from the said piston to each lever-nut N rotatively positioning the blade B. In the preferred form, a clevis 57 extends above the top of piston 39 to carry divergent links 56 on a common pivot 58. Each link 56 is selectively coupled by a separate pivot 59 to the lever-nut N to be actuated thereby, and all of which is accessible through the open front of the chest portion of the hub housing H. As best illustrated in FIGS. 5a-c of the drawings, the lever-nut N is of plate configuration with angularly spaced openings 59' for selective performance of the blading dependent upon the performance, for example, of the aircraft or other adaptations to which it is to be applied. Accordingly, high speed, mid speed and low speed blading positions are determined by the angularly spaced openings 59' embracing the mid range of pitch as shown, and extreme positioning is provided as shown in FIG. 5c to provide full feathering for mid speed blading performance. As shown, the lever portion of nut N operates through an arc of approximately 30 degrees to turn the propeller blade B between the selected low pitch and high pitch conditions.

A cover 60 closes the interior of the hub housing H and provides spring seats and rod guids 61 for the adjustor means F accessible at the exterior of the assembly for adjustment. The adjustor means F controls the lever means L responsive to the cylinder and piston means D, for trimming the blades B through the linkage to the lever-nuts N. As shown, a pair of diametrically opposite control rods 62 project in parallel relation from the piston 39 and slideably extend through the cover seat guides 61 to project forwardly therefrom. Compression springs 63 surround the rods 62, seating against the cover spring seats to yieldingly depress the piston 39 rearwardly and calibrated to control forward movement commensurate with the engine oil pressure applied to the cylinder bore 38.

Feathering and pitch limitation is provided for in a transverse header 64 fixed between the forward extremities of the rods 62 to move therewith over a stem 65 fixedly projecting therethrough from the cover 60. The stem 65 is concentric with the propeller axis and threadedly carries adjustably positionable stops 66 and 67 to restrict both forward and rearward movement of the header, thereby limiting blade rotation through the mechanism hereinabove described. Further, there is a restriction against feathering during low speed engine operation, despite the lower engine oil pressure available to the cylinder and piston means D. This restriction is effected by a cam and follower means 70, comprised of opposed spring biased balls 71 engageable with an inclined plane or cone 72 on the stem 65, positioned to hold a normal propeller pitch (see FIG. 5) until the engine is stopped and oil pressure ceases and under which condition the pressure of springs 63 cause the spring biased balls 71 to override the cone 72.

From the foregoing it will be seen that a commercially practical blade and propeller hub assembly is provided, especially for light aircraft and comparable fan installations. The blades per se are fabricated from readily available material adapted to extrusion and subject to easily performed machine and forming operations, while the hub assembly for feathering-to-pitch control is compact and the parts accessible for maintenance and repair. The propeller pitch is positively applied through the lever and spring movement responsive to engine speed and to the uniform oil pressure available at normal operational speeds. A pre-determined moderate pitch remains at lower operational speeds, and full feathering follows in response to stopping the engine with a consequent lack of oil pressure. The over balance of the trailing portion of the blade airfoil assures the application of pitch in response to rotation, to be followed in time by the build-up of engine oil pressure which maintains pitch according to the bias of the springs 63, and as restricted by the stop 66, while the optimum full feathered position is established by the stop 67.

Having described only a typical preferred form and applications of my invention, I do not wish to be limited or restricted to the specific details herein set forth, but wish to reserve to myself any modifications or variations that may appear to those skilled in the art:

I claim:

1. A propeller-fan blade formed of an elongated uniform cross section and comprised of, front and back cambers of uniform curvature, said front camber being retained from the blade root to the blade tip, and said back camber being truncated by a first flat back face tapered with respect to said front camber of the blade from the blade root toward the blade tip.

2. The propeller-fan blade as set forth in claim 1, wherein the said back camber of the blade is partially truncated by the flat back face at the blade root.

3. The propeller-fan blade as set forth in claim 1, wherein the said back camber of the blade is completely truncated by the flat back face at the blade tip.

4. The propeller-fan blade as set forth in claim 1, wherein a mounting rib at the blade root occupies a substantial width of the blade chord between a leading portion and a trailing portion of the back camber of the blade.

5. The propeller-fan blade as set forth in claim 1, wherein an integral mounting rib at the blade root occupies a substantial width of the blade chord between a leading portion and a trailing portion of the back camber of the blade, and wherein said back camber of the blade is truncated from the mounting rib to the blade tip by said first back face.

6. The propeller-fan blade as set forth in claim 1, wherein the said back camber of the blade is at least partially truncated by the flat back face between the blade root and the blade tip, and wherein a trailing portion of the back camber of the blade toward the tip thereof is truncated by a second back face increasing in width toward the blade tip.

7. The propeller-fan blade as set forth in claim 1, wherein an integral mounting rib at the blade root occupies a substantial width of the blade chord between a leading portion and a trailing portion of the back camber of the blade, wherein said back camber of the blade is truncated from the mounting rib to the blade tip, and wherein a trailing portion of the back camber of the blade toward the tip thereof is truncated by a second back face increasing in width toward the blade tip.

8. The propeller-fan blade as set forth in claim 1, wherein the elongated and truncated cross section with the aforesaid features therein is twisted from root to tip of the blade with pitch variations of its cambered cross section.

9. The propeller-fan blade as set forth in claim 1, wherein a mounting rib at the blade root occupies a substantial width of the blade chord between a leading portion and a trailing portion of the back camber of the blade, wherein said back camber of the blade is truncated from the mounting rib to the blade tip, wherein a trailing portion of the back camber of the blade toward the tip thereof is truncated by a second back face increasing in width toward the blade tip, and wherein the elongated and truncated cross section with the aforesaid features therein is twisted from root to tip of the blade with pitch variations of its cambered cross section.

10. A propeller-fan blade formed of an elongated uniform cross section and comprised of, a trailing flap portion continuing tangentially from a front camber and angularly from a back camber both of uniform curvature, said front camber being retained from the blade root to the blade tip, and said back camber being truncated by a first flat back face beginning at the root of the blade and tapered toward the tip of the blade with respect to the front camber of the blade.

11. The propeller-fan blade as set forth in claim 10, wherein the said back camber is completely truncated by the flat back face at the tip of the blade.

12. The propeller-fan blade as set forth in claim 10, wherein the said back camber is truncated by the first flat face and eliminated thereby at the blade tip, and wherein a second flat back face truncates the trailing flap portion of the blade and is tapered toward the tip thereof with a trailing portion increasing in width toward the blade tip.

13. The propeller-fan blade as set forth in claim 10, wherein the front and back chords extend between extruded leading and trailing portions forming parts of the same, the back camber being completely truncated by the first flat back face at the tip of the blade.

14. The propeller-fan blade as set forth in claim 10, wherein the front and back chords extend between leading and trailing portions of uniform curvature forming parts of the same, wherein the leading and trailing portions of the back camber of the blade are completely truncated by the first flat back face at the blade tip, and wherein a second flat back face truncates the trailing flap portion of the blade and is tapered toward the tip thereof with a trailing portion increasing in width toward the blade tip.

15. The propeller-fan blade as set forth in claim 10, wherein the front and back chords extend between leading and trailing portions of uniform curvature forming parts of the same, and wherein a mounting rib at the blade root occupies a substantial width of the back chord between the leading and trailing portions thereof.

16. The propeller-fan blade as set forth in claim 10, wherein the front and back chords extend between leading and trailing portions of uniform curvature forming parts of the same, and wherein an integral mounting rib at the blade root occupies a substantial width of the back chord between the leading and trailing portions thereof and the back camber being completely truncated by the first flat back face at the tip of the blade.

17. The propeller-fan blade as set forth in claim 10, wherein the front and back chords extend between leading and trailing portions of uniform curvature forming parts of the same, wherein an integral mounting rib at the blade root occupies a substantial width of the back chord between the leading and trailing portions thereof and the back camber being completely truncated by the first flat face at the tip of the blade, and wherein a second flat back face truncates the trailing flap portion of the blade and is tapered toward the tip thereof with a trailing portion increasing in width toward the blade tip.

18. The propeller-fan blade as set forth in claim 10, wherein the blade has a trailing edge profiled from the full chord of the flap intermediate the blade root and blade tip and to a reduced chord at the blade tip.

19. The propeller-fan blade as set forth in claim 10, wherein the blade has a trailing edge profiled from the full chord of the flap intermediate the blade root and blade tip and to a reduced chord at the blade tip, and wherein a second flat back face truncates the trailing flap portion of the blade and is tapered toward the tip thereof with a trailing portion increasing in width toward the blade tip.

20. The propeller-fan blade as set forth in claim 10, wherein the front and back chords extend between leading and trailing portions of uniform curvature forming parts of the same, wherein an integral mounting rib at the blade root occupies a substantial width of the back chord between the leading and trailing portions thereof and the back camber being completely truncated by the first flat face at the tip of the blade, and wherein the blade has a trailing edge profiled from the full chord of the flap intermediate the blade root and blade tip and to a reduced chord at the blade tip.

21. The propeller-fan blade as set forth in claim 10, wherein the front and back chords extend between leading and trailing portions of uniform curvature forming parts of the same, wherein an integral mounting rib at the blade root occupies a substantial width of the back chord between the leading and trailing portions thereof and the back camber being completely truncated by the first flat face at the tip of the blade, wherein the blade has trailing edge profiled from the full chord of the flap intermediate the blade root and blade tip and to a reduced chord at the blade tip, and wherein a second flat back face truncates the trailing flap portion of the blade and is tapered toward the tip thereof with a trailing portion increasing in width toward the blade tip.

22. The propeller-fan blade as set forth in claim 10, wherein the elongated and truncated cross section with the aforesaid features therein is twisted from root to tip of the blade with pitch variations of its cambered cross section.

23. The propeller-fan blade as set forth in claim 10, wherein the front and back chords extends between leading and trailing portions of uniform curvature forming parts of the same, wherein an integral mounting rib at the blade root occupies a substantial width of the back chord between the leading and trailing portions thereof and the back camber being completely truncated by the first flat face at the tip of the blade, wherein the blade has a trailing edge profiled from the full chord of the flap intermediate the blade root and blade tip and to a reduced chord at the blade tip, wherein a second flat back face truncates the trailing flap portion of the blade and is tapered toward the tip thereof with a trailing portion increasing in width toward the blade tip, and wherein the elongated and truncated cross section with the aforesaid features therein is twisted from root to tip of the blade with pitch variations of its cambered cross section.

* * * * *